United States Patent
Antonov et al.

(10) Patent No.: US 10,372,907 B2
(45) Date of Patent: Aug. 6, 2019

(54) SYSTEM AND METHOD OF DETECTING MALICIOUS COMPUTER SYSTEMS

(71) Applicant: AO Kaspersky Lab, Moscow (RU)

(72) Inventors: Alexey E. Antonov, Moscow (RU); Alexey M. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 160 days.

(21) Appl. No.: 15/215,116

(22) Filed: Jul. 20, 2016

(65) Prior Publication Data

US 2017/0351859 A1 Dec. 7, 2017

(30) Foreign Application Priority Data

Jun. 2, 2016 (RU) ................................ 2016121877

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01)

(58) Field of Classification Search
CPC .................................................... G06F 21/556
USPC ...................................................... 726/22–25
See application file for complete search history.

(56) References Cited

U.S. PATENT DOCUMENTS

| | | | |
|---|---|---|---|
| 7,673,341 B2 | 3/2010 | Kramer et al. | |
| 7,958,559 B2* | 6/2011 | Hurley | G06F 21/552 713/187 |
| 9,275,065 B1* | 3/2016 | Ganesh | G06F 17/30082 |
| 10,033,751 B2* | 7/2018 | Donnelly | H04L 63/0263 |
| 10,091,169 B2* | 10/2018 | Cohen | H04L 67/2823 |
| 10,097,581 B1* | 10/2018 | Allen | G06F 21/554 |
| 2010/0039220 A1* | 2/2010 | Davis | G06F 21/31 340/5.52 |
| 2011/0183217 A1 | 7/2011 | Takahashi | |
| 2015/0039513 A1* | 2/2015 | Adjaoute | G06Q 20/4016 705/44 |
| 2015/0067409 A1* | 3/2015 | Martz | G06F 21/00 714/47.2 |
| 2015/0082430 A1 | 3/2015 | Sridhara et al. | |
| 2015/0163231 A1 | 6/2015 | Sobko et al. | |

(Continued)

FOREIGN PATENT DOCUMENTS

| | | |
|---|---|---|
| EP | 2081356 A1 | 7/2009 |
| JP | 2011090784 A | 5/2011 |

OTHER PUBLICATIONS

Extended European Search Report for 16195897.0 dated Nov. 29, 2016.

*Primary Examiner* — Jahangir Kabir
(74) *Attorney, Agent, or Firm* — Arent Fox LLP; Michael Fainberg

(57) ABSTRACT

Disclosed are systems and method for detecting a malicious computer system. An exemplary method comprises: collecting, via a processor, characteristics of a computer system; determining relations between collected characteristics of the computer system; determining a time dependacy of at least one state of the computer system based on determined relations; determining the at least one state of the computer system based at least on determined time dependacy; and analyzing the at least one state of the computer system in connection with selected patterns representing a legal or malicious computer system to determine a degree of harmfulness of the computer system.

15 Claims, 3 Drawing Sheets

(56) References Cited

U.S. PATENT DOCUMENTS

2016/0055335 A1 2/2016 Herwono et al.
2017/0201530 A1* 7/2017 Mead ................. H04L 63/1416

* cited by examiner

SYSTEM AND METHOD OF DETECTING MALICIOUS COMPUTER SYSTEMS

CROSS-REFERENCE TO RELATED APPLICATIONS

This application claims benefit of priority under 35 U.S.C. 119(a)-(d) to a Russian Application No. 2016121877 filed on Jun. 2, 2016, which is incorporated by reference herein.

FIELD OF TECHNOLOGY

The present disclosure relates generally to antivirus technologies, more specifically, systems and methods of detecting malicious computer systems.

BACKGROUND

The rapid development of computer technologies in the last decade, as well as the widespread use of various computing devices (personal computers, notebooks, tablets, smartphones, etc.), have become a great incentive for the use of these devices in various areas of activity and to solve a huge number of problems (from Internet surfing to bank transfers and electronic document circulation). In parallel with the growth in the number of computing devices and software running on these devices, the number of malicious programs has also grown at a rapid pace.

At present, a huge number of kinds of malicious programs exist. Some of them steal personal and confidential user data from the devices of users (such as logins and passwords, banking information, electronic documents). Others turn the devices of users into so-called botnets for attacks, such as denial of service (DDOS) attacks, or to sort through passwords using the brute force method, on other computers or computer networks. Still others propose paid content to users through intrusive advertising, paid subscriptions, sending of SMS to toll numbers, and so on.

Specialized programs, or antivirus applications, are used to deal with malicious programs (that is, to detect malicious programs, prevent infection and restore computer systems infected with malicious programs). Antivirus programs employ diverse technologies to detect a whole array of malicious programs, such as:

signature analysis—searching for correspondences of a particular code section of a program being analyzed to a known code (signature) from a database of signatures of malicious programs;

heuristic analysis—emulation of the working of the program being analyzed, creating emulation logs (containing data on the API function calls, the parameters transmitted, the code sections of the program being analyzed, and so on), and searching for correspondences of the data from the logs so created with data from a database of emulations of malicious programs;

white and black lists—searching for a computed check sum of a program being analyzed (or portions thereof) in a database of check sums of malicious programs (black lists) or a database of check sums of legal programs (white lists); and proactive protection—intercepting of application-programming interface (API) function calls of a program being analyzed and running in the system, creating of logs on the working of the program being analyzed (containing data on the API function calls, the parameters transmitted, the code sections of the program being analyzed, and so on), and searching for correspondences of the data from the logs so created with data from a database of calls of malicious programs.

In response to these antivirus applications, malicious programs are increasingly making use of methods to counteract detection of their presence on infected computer systems by antivirus programs, such as:

code obfuscation to defeat signature analysis—converting the original text (such as JavaScript scripts) or executable code of programs to a form which retains their functionality, yet which impedes analysis, an understanding of the working algorithms, and modification during decompilation;

complication of the behavior to defeat heuristic analysis—the use of a large number of API function calls or operations not affecting the program I/O working results, yet interfering with its emulation by antivirus programs; and tracking the behavior of foreign programs to defeat proactive protection—constant tracking of the behavior of foreign programs in the operating system, searching for antivirus programs and counteracting them (for example, concealment or substitution of own code for analysis).

By utilizing various resources such as code generators (construction programs able to automatically create malicious programs, having a functionality specified by the hacker), obfuscators (programs able to alter the executable code of programs, thereby complicating their analysis, without altering their functionality), packers (program modules embedded into programs, encrypting the executable code of the programs and decrypting it when the program is launched), and so on, hackers are able to quickly and easily create and disseminate a large number of new versions of their malicious programs undetectable by antiviruses.

Thus, even with antiviruses installed, the users' computers may be subjected to an infection, as an antivirus tracking the behavior or structure of all applications installed on the users' computers may not detect new modifications or new varieties of malicious applications. While trying to conceal their presence on the computers of users, malicious programs continue to perform their malicious activity which, even though concealed, is present on the computers and leaves traces. Based on the traces left behind, and by the uncharacteristic behavior of applications individually and the entire computer system as a whole, one may identify malicious applications.

In carrying out targeted cyber attacks (Advanced Persistent Threats, APT), which are a technology of attacking selected computer systems (internal networks of major enterprises, corporate databases, personal data of a tremendous number of users stored in centralized manner, such as banking or passport data, and so on), hackers must possess a modern level of expert knowledge and substantial resources, allowing them to create ways of achieving their goals by various attack vectors (such as informational, physical, and deception). These goals usually include installing and propagating their presence inside the computer technology infrastructure of the target organization to achieve the intentions of extracting information, disruption, or creating interference to critical aspects of the task, program, or service being provided, or to take up a position allowing these intentions to be carried out in future. A targeted cyber attack, such as an "advanced persistent threat," accomplishes its goals more than once in the course of a prolonged period of time; adapts to the efforts of the defenders to present resistance to the threat; and aims to preserve its level of penetration in the target infrastructure, which level is needed to accomplish its intentions.

For example, in order to sabotage the working of an enterprise, decrease the effectiveness of the working of its information systems or entirely shut them down, hackers must know how those computer systems work, what hardware they are using, which applications are running on the hardware, which defensive means are being used, and what strong and weak points they possess. With such informational preparation, hackers may be able to create malicious programs which will be invisible to the antivirus applications running on the computer system being attacked and employ methods of introducing the created malicious programs not leaving behind any traces of such introduction.

The basic principle of detecting such targeted cyber attacks may include the detection of malicious activity being carried out on the protected computer system.

The known techniques may handle the tasks of detecting known malicious applications (both in terms of structure and behavior), as well as new malicious applications but with already known behavior. These known techniques may not adequately handle the task of detecting applications which mask themselves and are in no way manifested, and designed to defeat the known means of defense.

Accordingly, there is a need to solve the problem of detecting malicious computer systems, i.e., systems on which malicious activity is taking place, even in cases when the sources of the malicious activity remain concealed, and the malicious applications themselves present active countermeasures to the known means of defense.

SUMMARY

Disclosed are systems and method for detecting a malicious computer system. One exemplary method comprises: collecting, via a processor of a computing device, characteristics of a computer system; determining relations between collected characteristics of the computer system; determining a time dependacy of at least one state of the computer system based on determined relations; determining the at least one state of the computer system based at least on determined time dependacy; and analyzing the at least one state of the computer system in connection with selected patterns representing a legal or malicious computer system to determine a degree of harmfulness of the computer system.

In one exemplary aspect, collecting the characteristics of the computer system comprises collecting characterisctis of at least one of: characteristics of computing resources of the computer system, characteristics of software running on the computer system, and characteristics of data being processed on the computer system.

In one exemplary aspect, the characteristics of computing resources of the computer system comprise at least one of: characteristics of a main memory of the computer system, performance of the computer system, and characteristics of a network environment with which the computer system is associated.

In one exemplary aspect, the characteristics of software running on the computer system comprise at least one of: identifiers of one or more applications running in the computer system and characteristics of files associated the one or more applications, records from configuration files of the one or more applications running in the computer system, and relations between the one or more applications.

In one exemplary aspect, the characteristics of data being processed on the computer system comprise at least one of: identifiers of a source and a recipient of the data, type of the data, and a data transmission method.

In one exemplary aspect, a relation is configured as a function of a change in values of one characteristic when values of another characteristic are changed, and determining the relations between the collected characteristics of the computer system comprises: using a multidimensional space for representing values of the collected characteristics, and determining the at least one state of the computer system based at least on a projection in the multidimensional space of selected characteristics.

In one exemplary aspect, determining the time dependacy of the at least one state of the computer system based on the determined relations comprises determining rules for changes in values of the characteristics describing the at least one state of the computer system as a function of time.

In one exemplary aspect, determining the at least one state of the computer system based at least on the determined time dependacy comprises identifying nonstandard behaviors of the computer system in accordance with an analysis of the determined time dependacy and the changes in values of the characteristics.

In one exemplary aspect, the selected patterns representing the legal or malicious computer system are configured to be retrieved from at least one database of patterns, each pattern corresponding to a previously triggered rule for a characteristic change of the computer system.

In one exemplary aspect, the method further comprises evaluating the degree of harmfulness of the computer system against a selected threshold value to determine whether the computer system is legal or malicious.

An exemplary system for detecting at least one malicious computer system, comprising: at least one processor of a computing device configured to: collect characteristics of a computer system; determine relations between collected characteristics of the computer system; determine a time dependacy of at least one state of the computer system based on determined relations; determine the at least one state of the computer system based at least on determined time dependacy; and analyze the at least one state of the computer system in connection with selected patterns representing a legal or malicious computer system to determine a degree of harmfulness of the computer system.

An exemplary non-transitory computer readable medium storing computer executatble codes for causing at least one computer to: collect, via a processor of the at least one computer, characteristics of a computer system; determine relations between collected characteristics of the computer system; determine a time dependacy of at least one state of the computer system based on determined relations; determine the at least one state of the computer system based at least on determined time dependacy; and analyze the at least one state of the computer system in connection with selected patterns representing a legal or malicious computer system to determine a degree of harmfulness of the computer system.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
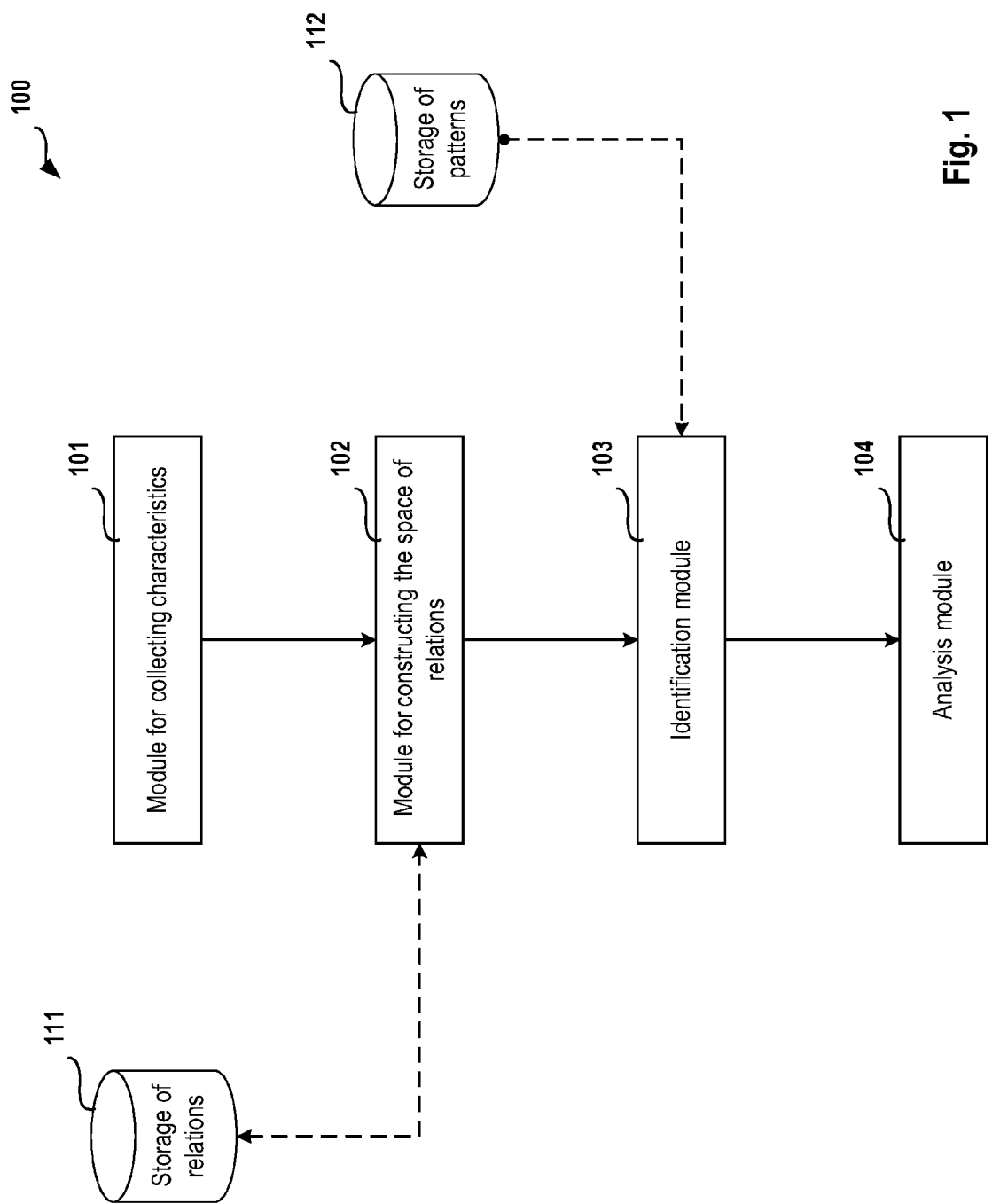
FIG. 1 presents a structural diagram of a system for detection of malicious computer systems according to aspects of the invention.

Example aspects are described herein in the context of a system, method and computer program product for detecting a malicious computer system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts are introduced as follows for describing various aspects of the invention.

A malicious application (malware, malicious software) may include any software designed to obtain unauthorized access to computing resources of a computer system or to information being stored on the computer system, with the goal of unauthorized use of the resources of the computer system or causing harm (inflicting damage) to the owner of the information, and/or the owner of the computer system, by copying, distorting, deleting or substituting the information.

Malicious activity may include actions performed by malicious applications during their execution.

Malicious computer system may include a computer system on which malicious activity is being carried out.

Legal computer system may include a computer system on which no malicious activity is being carried out.

Computer system characteristics may include a collection of various properties of a computer system determining one of the actions being executed by the computer system.

For example, according to aspects of the invention, characteristics of a computer system may include the speed of operation of the computer system, meaning how much time the computer system will spend on performing a certain predetermined action. The speed of operation of a computer system may include at least the set of the following properties:
  the performance of the central processing unit (measured in operations per second);
  the speed of exchanging data with the main memory (measured in bytes per second); and
  the speed of exchanging data with external storage media (measured in bytes per second), and it is a nondimensional quantity, normalized with respect to the operating speed of a reference computer system.

Another characteristic of a computer system may be the number of applications working at the same time in the computer system. Unlike the previous example, this characteristic may be described by only one property of the computer system, namely, the available main memory (measured in bytes).

The computer system state may include the set of characteristics of a computer system capable of describing the actions of the applications running on the computer system, as a function of the available computing resources of the computer system and for a given set of data.

The pattern of a computer system state may include a previously prepared set of a portion of the characteristics of a known computer system which is sufficient to describe the set of actions of the applications running on the computer system.

FIG. 1 presents a structural diagram of a system for detection of malicious computer systems according to aspects of the invention. As depicted, the system may include, among other features, a module for collecting characteristics 101, a module for constructing the space of relations 102, an identification module 103, an analysis module 104, a storage of relations 111, and a storage of patterns 112.

In one exemplary aspect, the module for collecting characteristics 101 may be configured to:
  collect characteristics of the computer system; and
  send the collected characteristics to the module for constructing the space of relations 102.

The characteristics of the computer system may include but not limited to:
  the characteristics of the computing resources of the computer system;
  the characteristics of the software running on the computer system; and
  the characteristics of the data being processed on the computer system.

The characteristics of the computing resources of the computer system may include the following but not limited to:
  the main memory of the computer system;
  the performance of the computer system; and
  the characteristics of the network environment.

The characteristics of the software running on the computer system may include the following but not limited to:
  identifiers of applications running in the computer system, as well as of files associated with the identified applications (such as names, complete paths to executable files or check sums of executable files);
  records from the configuration files of the applications running in the computer system (such as entries in the registry or entries in ini files); and
  relations between applications characterizing which applications exchange data and how.

The characteristics of the data being processed on the computer system may include the following but not limited to:
  identifiers of the source and recipient of the data (for example, names of applications between which a data exchange is occurring);
  type of data (for example, database files, images, etc.); and
  the method of data transmission (for example, data transmitted by computer network or from one application to another using methods of interprocess communication).

For example, in accordance with aspects of the invention, a bank employee may use a personal computer to work with databases having client personal data stored thereon. The personal computer may have installed thereon an operating system "Windows 10", an application for working with databases "SQL Server Management Studio", the "Internet Edge" browser, the "Microsoft Office" application package, and a set of additional utilities from various developers. The module for collecting characteristics 101 may be configured to collect the following characteristics:
  characteristics of various computing resources of the computer system of the user:

volume of available main memory (e.g., 8 GB);
volume of local and network disks (for example, disk drive C: 120 GB, D: 500 GB, Z: 10 TB);
performance of the central processing unit of the computer system (e.g., 10 GFLOP);
throughput of the computer network (e.g., 100 Mbit/s);
characteristics of software running on the computer system of the user (on the example of "Internet Edge"):
installation paths of applications (e.g., C:\Program Files\Internet Edge\edge.exe, etc.);
frequency of starting and time of operation of the installed applications (e.g., 30 times a session: 8:30:17 to 8:34:05, 8:46:56 to 9:01:30, etc.);
statistics of functions of the installed applications that are executed (e.g., WriteFile:13757, ReadFile: 76446, CreateSocket:5561, etc.); and
statistics of use of computing resources of the computer system by the installed applications, including but not limited to:
volume of main memory used (e.g., 1034 MB);
level of workload of the central processing unit of the computer system (e.g., 7.56%);
network addresses with which data exchange is occurring (e.g., 192.168.17.1, 192.168.34.56, etc.); and
volume of data being read from storage media or being written to storage media (e.g., data in: 5641 MB, data out: 675 MB);
characteristics of the network environment may comprise:
network addresses with which data exchange is occurring (e.g., 192.168.17.1, 192.168.34.56, etc.); and
speed of data exchange at the network addresses (e.g., 192.168.17.1: 30 MB/s, 192.168.34.56: 15 MB/s);
user activity may comprise:
which applications were started by the user (e.g., SQL Server Management Studio); and
which elements of the graphic interface of the installed applications have been used (e.g., Dialog: ID=12145, Button: ID=17, 87).

For example, the module for collecting characteristics 101 at any given moment in time may collect the characteristics which uniquely define or indicate the current state of the computer system, i.e., the module 101 may determine all installed applications, files associated with these applications, and also the processes which have occurred during the working of these applications.

The module for constructing the space of relations 102 may be configured to:
determine the relations between the obtained characteristics of the computer system, where a relation may be a function of the change in values of one characteristic in response to changing values of another characteristic;
determine the time dependency of the state of the computer system based at least on an analysis of the determined relations, where the state of the computer system may be characterized by the set of determined relations, and the time dependency of the state of the computer system including rules describing the changes in the values of the characteristics describing the state of the computer system, as a function of time; and
transmit the determined time dependency of the state of the computer system to the identification module 103.

The analysis of the previously determined relations between the obtained characteristics of the computer system when determining the time dependency of the state of the computer system may comprise the following but not limited to:
identifying the time dependency of the change in values of one characteristic involved in the description of the state of the computer system by using known dependencies of this characteristic on other characteristics for which time dependencies have already been established; and
composing rules for the change in values of the mentioned characteristic according to the identified time dependency of the values of the mentioned characteristic.

The determined relations may be supplemented with relations obtained from the storage of relations 111, and also the determined relations may be kept in the storage of relations 111, in order to use the stored relations during the next determination of relations (for example, upon change in the state of the computer system).

For example, one may save the relations of a legal computer system in the above-described manner and compare them to the relations of a malicious computer system.

The values of all characteristics collected by the module 101 may be represented in the form of points of a multidimensional space, in which each dimension represents one characteristic. The collection of these points in such a case may define a certain surface. By selecting one or more characteristics, one may obtain from the surface a projection in the space of selected characteristics. If such projection may characterize the state of the computer system as a whole, the obtained projection may characterize the change in state of the system according to the selected characteristics.

For example, the selected characteristics may include but not limited to: a) the volume of main memory, and b) the order of commencement of the working of the application in the computer system. Each application launched according to b) may utilize a certain volume of main memory of a), so that the volume of available main memory decreases with each new application launched. To construct a two-dimensional function of the available volume of main memory in dependence on the number of applications running in the computer system, a characteristic diminishing function of the kind:

$$M \sim \frac{1}{N \times e^{\frac{N}{\overline{N}}}}$$

may be obtained, where M is the volume of available main memory, N is the number of applications running in the computer system, and $\overline{N}$ is the mean number of applications running in the computer system, with which function the computer system can operate. The obtained function may change little if the computer system is unchanged (for example, no new applications are installed) or if the computer system is slightly changed (applications are installed that are not often used or have little influence on the working of the computer system).

Each characteristic collected may have several values dependent on the time of operation of the computer system. The relations between the characteristics so determined may also change over time.

For example, the volume of main memory may not depend at all on the number of operations being executed by the processor of the computer system until such time as an image processing or password guessing application is launched on the computer system. But after the launching of such application, the dependency of the volume of main memory on the number of operations being executed by the processor may become the reverse $$\left(M \sim \frac{1}{N}, \text{where } N \text{ is the number of operations executed}\right).$$

According to one exemplary aspect of the invention, an analysis of the time dependencies may enable identifying nonstandard behavior of a computer system, which may indicate that a malicious software is running in the system. For example, a change in the volume of the main memory prior to a particular moment may be characterized by low-period oscillations (e.g., large volumes of main memory were relatively seldom assigned or freed up by the operating system on demand of the running applications), but subsequently these oscillations became high-period ones (e.g., small volumes of main memory began to be often assigned or freed up by the operating system on demand of the running applications). This may indicate that an application has started running in the computer system which performs a small number of operations with memory and then at once transmits the result of the operations to another application or a different application which saves the result to a hard disk, which is not behavior distinctive of legal applications. However, such behavior may be distinctive of certain kinds of malicious applications (such as the so-called Trojan spies—malicious programs involved in collecting confidential data from the computers of users).

In one exemplary aspect, the identification module 103 may be configured to:
    determine the state of a computer system based at least on an analysis of the obtained time dependency of the state of the computer system;
    select from the storage of patterns 112 patterns of states of the computer system which may represent:
        the state of a legal computer system; and
        the state of a malicious computer system;
    compare the determined state of the computer system with the selected patterns; and
    send the result of the comparison to the analysis module 104.
The state of the computer system may be determined:
    upon triggering of a number of rules for changes of the computer system:
        an application has begun to run;
        an application has finished running; and
        previously selected API functions have been called up; and
    periodically, at established points in time.

In one exemplary aspect, the storage of patterns 112 may save patterns of states of the computer system including states of the computer system which characterize a previously selected behavior of the computer system.

For example, the pattern of states of the computer system may contain only characteristics defining the network activity of the applications, and thus the state of the computer system may characterize only the behavior of the computer system when exchanging data in the computer network.

Patterns of states of the computer system may be selected from the storage of patterns 112 in dependence on a previously triggered rule due to a change of the computer system.

For example, in the case when an application has begun running in the computer system, a pattern of states of the computer system may be selected which contains characteristics specifying the initialization of an application in the operating system.

The result of the comparison of the states of computer systems may be a numerical value from 0 (in the event that both states of the computer system are sets of identical characteristics of the computer system, when the values of these characteristics of the computer system are equal for both states) to 1 (in the event that one state of the computer system is a set of characteristics of the computer system different from the characteristics comprising a second state of the computer system).

For example, each state of the computer system may be represented as a multidimensional vector, including components that are the characteristics of the computer system and specify the states of the computer system. In this case, the comparison of two states of the computer system may comprise calculating the scalar product of two multidimensional vectors, each of which may represent one of the states of the computer system, and the result of this comparison may be a number indicating how much one vector differs from the other one (0—the states of the computer system are identical, π—the states of the computer system are maximally different).

The analysis means 104 may be configured to:
    determine the degree of harmfulness of a computer system based at least on an analysis of the obtained result of the comparison of the state of the computer system with selected patterns; and
    pronounce a verdict recognizing the computer system as malicious based on the results of the comparison of the determined degree of harmfulness of the computer system in connection with a selected threshold value.

The degree of harmfulness of a computer system may be a numerical value obtained as a result of the comparison of the states of the computer systems, characterizing:
    the degree of difference from a previously determined legal computer system; and
    the degree of similarity to a previously determined malicious computer system.

For example, as a result of the comparison of a particular state of a computer system with a previously specified state of a legal computer system on which new software is installed a degree of harmfulness of 0.01 was calculated (e.g., the computer system with a high degree of probability is legal), but on the other hand as a result of a comparison with a previously specified state of a malicious computer system on which a malicious application is running and providing remote control (backdoor) of a victim's computer a degree of harmfulness of 0.5 was calculated (a high indicator, but not enough to determine the computer system as malicious), which together with the fact that a software installation is occurring on the computer system yielded a degree of harmfulness of 0.9, which means that the computer system being analyzed may be determined as malicious.

The storage of relations 111 may be configured to:
    store relations between the characteristics of the computer system gathered by the module for collecting characteristics 101; and
    provide said the collected relations to the module for constructing the space of relations 102.
The storage of patterns 112 may be configured to:
    store patterns previously determined:
        states of a legal computer system; and
        states of a malicious computer system;
    provide the patterns to the identification module 103.

The patterns may comprise:
  selected in advance from the states of computer systems on the basis of selected security policies (e.g., what is allowed to be done on the computer system, and how);
  selected in advance from the states of computer systems of users on the basis of the results of an antivirus scanning of users' computers (from computers recognized as being infected with malicious applications, one obtains the states of malicious computer systems, and from computers recognized as being legal, one obtains the states of legal computer systems); and
  determined in advance as previously obtained states of the computer system being analyzed (for example, if no changes have been made to the computer system for a long time, or the changes made are negligible).

In one exemplary aspect, detection of malicious computer systems may be based on an analysis of a computer system on which a user #1 has worked for a long time, processing Microsoft Word documents, while as of a given moment a user #2 (a hacker) has begun working remotely on the computer system, among other things visiting malicious sites and downloading and running malicious applications designed to steal private user data.

At the beginning, the computer system was legal, i.e., no malicious activity was being done on it. During the work of user #1 in the computer system with Microsoft Word documents, there may be a regular collection of characteristics of computer systems, such as the volume of main memory being used, the level of workload of the central processing unit in dependence on the actions of the user on the computer system, the properties of the network connections, the network addresses with which data is exchanged, the properties of the data sent through the computer network (volume, type, structure, and so on). From these collected characteristics of the computer system, characteristics were selected that describe the actions performed by user #1, i.e., characteristics related to the processing of Microsoft Word documents (such as characteristics for which a change in values was dependent on a change in values of the characteristics specifying the working of Microsoft Word, such as the volume of data transferred by Microsoft Word to a network disk, the network addresses being visited by the user, the Microsoft Word documents downloaded by him, and so on), by the working of the Microsoft Word application itself (for example, network addresses from which Microsoft Word updates were downloaded). Over time, the state of the legal computer system was determined based on the collected data, being a set of selected characteristics of the computer system.

All the values of the selected characteristics obtained at a given point in time may be represented as a set of points situated in a multidimensional space, where each characteristic selected, as discussed the above, may comprise one of the dimensions of that space. This set of points may form a closed surface (which can be called the "surface of the computer system state"), encompassing a region of space whose points characterize one of the legal states of the computer system (which can be called the "region of legal states of the computer system"), i.e., the states of the computer system obtained during the working of user #1, while the points outside the region encompassed by the mentioned surface may comprise states of the computer system whose activity is different from that performed by user #1. Any action of user #1 in the computer system may result in changes in the values of the selected characteristics, which in turn is reflected in the "surface of states of the computer system." As a result, an old state of the computer system may be obtained and described by the "surface of states of the computer system" #t1.1, and a new state of the computer system may be obtained and described by the "surface of states of the computer system" #t1.2. In one exemplary aspect, the degree of difference of the "surface of states of the computer system" #t2 from the "surface of states of the legal computer system" t1 may characterize the degree of harmfulness of the computer system at moment of time t1.2.

Alternatively, when user #1 was working in the computer system, the result of the comparison of the state of the computer system with the pattern of the state of the legal computer system may yield a degree of harmfulness of the computer system equal to 0.05, the comparison with the pattern of the state of a malicious computer system may yield a degree of harmfulness of 0.01. Thus, the computer system in which user #1 was working may be determined as being legal.

In the case when user #2 was working in the computer system, he may regularly visit malicious sites, and download and run malicious applications from those sites. The change in behavior of the user may also be reflected in the behavior of the computer system, since additional functions began to be used for working with remotely located files (for example, the launching of browsers, entering of malicious sites, and so on). At a certain time, a malicious application may be downloaded from one of the network addresses to the computer system, installed and launched, and begin to collect private data and transmit it through the computer network. Such activity may result in a change in values of many characteristics of the computer system, which in turn was strongly reflected in the resulting state of the computer system. If all values of the characteristics are represented in the form of points of a multidimensional space, where the dimensions are the characteristics of the computer system, as described above, the surface (the "surface of the current state of the computer system") formed from the points at the moment when the aforementioned malicious application was working in the computer system differed significantly from the surface (the "surface of the legal state of the computer system") formed from the points at the time when the computer system was legal. This difference may be reflected in the fact that the "region of legal states of the computer system" and the "region of current states of the computer system" have a common region of small volume as compared to their full volumes.

As a result of the comparison of the state of the computer system with the pattern of the state of the legal computer system, a degree of harmfulness of the computer system equal to 0.50 may be determined and calculated, the comparison with the pattern of the state of a malicious computer system may produce a degree of harmfulness of 0.80. Thus, the computer system in which user #2 was working may be determined as being malicious.

Figure 2:
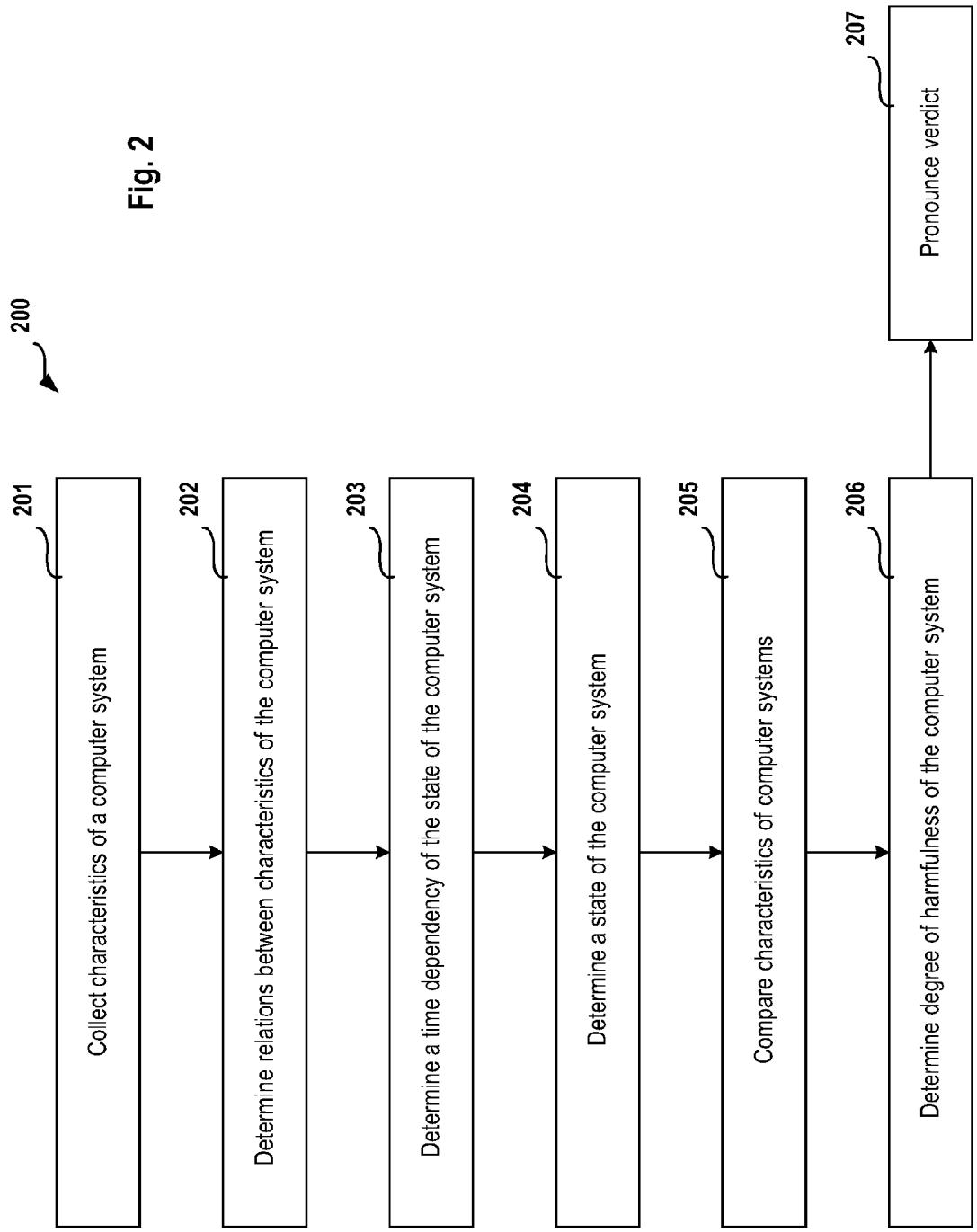
FIG. 2 presents a structural diagram of a method of detecting malicious computer systems according to aspects of the invention.

FIG. 2 shows a structural diagram of a method of detection of malicious computer systems according to one exemplary aspect of the invention. The structural diagram of the method of detection of malicious computer systems may begin with a step 201 in which characteristics of the computer system may be identified and collected, a step 202 in which relations between the characteristics of the computer system may be determined, a step 203 in which the time dependency of the state of the computer system may be determined, a step 204 in which the state of the computer system may be determined, a step 205 in which the characteristics of the computer systems may be compared, a step 206 in which the degree of harmfulness of the computer system may be determined, and a step 207 in which a verdict may be pronounced.

More specifically, referring to FIG. 2, in step 201, the characteristics of the computer system may be identified and collected.

The characteristics of the computer system may include the following but not limited to:
- the characteristics of the computing resources of the computer system;
- the characteristics of the software running on the computer system; and
- the characteristics of the data being processed on the computer system.

The characteristics of the computing resources of the computer system may include the following but not limited to:
- the main memory of the computer system;
- the performance of the computer system; and
- the characteristics of the network environment.

The characteristics of the software running on the computer system may include the following but not limited to:
- identifiers of applications running in the computer system, as well as of files associated with the identified applications (such as names, complete paths to executable files or check sums of executable files);
- records from the configuration files of the applications running in the computer system (such as entries in the registry or entries in ini files); and
- relations between applications characterizing which applications exchange data and how.

The characteristics of the data being processed on the computer system may include the following but not limited to:
- identifiers of the source and recipient of the data (for example, names of applications between which a data exchange is occurring);
- type of data (for example, database files, images, etc.);
- the method of data transmission (for example, data transmitted by computer network or from one application to another using methods of interprocess communication).

In step 202, the relations may be determined between the characteristics of the computer system collected in step 201, where a relation may comprise a dependency of a change in the values of one characteristic upon change in the values of another characteristic.

The analysis of the previously determined relations between the characteristics of the computer system collected in step 201 when determining the time dependency of the state of the computer system may comprise:
- identifying the time dependency of the change in values of one characteristic involved in the description of the state of the computer system by using already known dependencies of this characteristic on other characteristics for which time dependencies have already been established; and
- composing rules for the change in values of the mentioned characteristic by the identified time dependency of the values of the mentioned characteristic.

The determined relations may be supplemented with relations obtained from the storage of relations 111, and the determined relations may be stored in the storage of relations 111, such that the stored relations may be used during the next determination of relations (for example, upon change in the state of the computer system).

The values of all characteristics collected in step 201 may be represented in the form of points of a multidimensional space, in which each dimension may represent one characteristic. The collection of the mentioned points in such a case may specify a certain surface. By selecting the necessary characteristics, one may obtain from the specified surface a projection in the space of selected characteristics. If the described projection characterizes the state of the computer system as a whole, the obtained projection may characterize the change in state of the system for the selected characteristics.

Each characteristic collected in step 201 may have several values dependent on the time of operation of the computer system. The relations between the characteristics so determined may also change over time.

In step 203, the time dependency may be determined for the state of the computer system on the basis of an analysis of the relations determined in step 202, where the state of the computer system may be characterized by the set of relations so determined, and the time dependency of the state of the computer system may comprise rules describing changes in the values of the characteristics describing the state of the computer system as a function of time.

An analysis of the time dependencies may enable determining and tracking nonstandard behavior of a computer system, which may indicate that a malicious software is running in the system.

In step 204, the state of the computer system may be determined on the basis of an analysis of the time dependency of the state of the computer system as determined in step 203.

The state of the computer system may be determined:
- upon triggering of a number of rules for changes of the computer system:
  - an application has begun to run;
  - an application has finished running; and
  - previously selected API functions have been called up; and
- periodically, at established moments of time.

In step 205, the characteristics of the computer systems may be compared. More specifically:
- patterns of states of the computer system may be selected from the storage of patterns 112 which may represent:
  - the state of a legal computer system; and
  - the state of a malicious computer system;
- the state of the computer system determined in step 204 may be compared with the selected patterns.

The patterns may comprise:
- selected in advance from the states of computer systems on the basis of selected security policies (e.g., what may be allowed to be done on the computer system, and how);
- selected in advance from the states of computer systems of users on the basis of the results of an antivirus scanning of users' computers (from computers recognized as being infected with malicious applications, one obtains the states of malicious computer systems, and from computers recognized as being legal, one obtains the states of legal computer systems);
- determined in advance as previously obtained states of the computer system being analyzed (for example, if no changes have been made to the computer system for a long time, or the changes made are negligible).

In one exemplary aspect, one may store in the storage of patterns 112 patterns of states of the computer system representing states of the computer system including a previously selected behavior of the computer system.

One may also select from the storage of patterns 112 patterns of states of the computer system as a function of a previously triggered rule for a change of the computer system.

The result of the comparison of the states of computer systems may be a numerical value from 0 (in the event that both states of the computer system are sets of identical characteristics of the computer system, when the values of the mentioned characteristics of the computer system are equal for both states) to 1 (in the event that one state of the computer system is a set of characteristics of the computer system different from the characteristics whose set constitutes a second state of the computer system).

In step 206, the degree of harmfulness of the computer system may be determined on the basis of the analysis of the result of the comparison of the states of the computer system obtained in step 205.

The degree of harmfulness of the computer system may comprise a numerical value obtained as a result of the comparison of the states of the computer systems, including the following but not limited to:
the degree of difference from a previously determined legal computer system; and
the degree of similarity to a previously determined malicious computer system.

In step 207, a verdict may be determined and pronounced identifying the computer system as malicious based on the results of the comparison of the degree of harmfulness of the computer system as determined in step 206 in connection with a selected threshold value.

Figure 3:
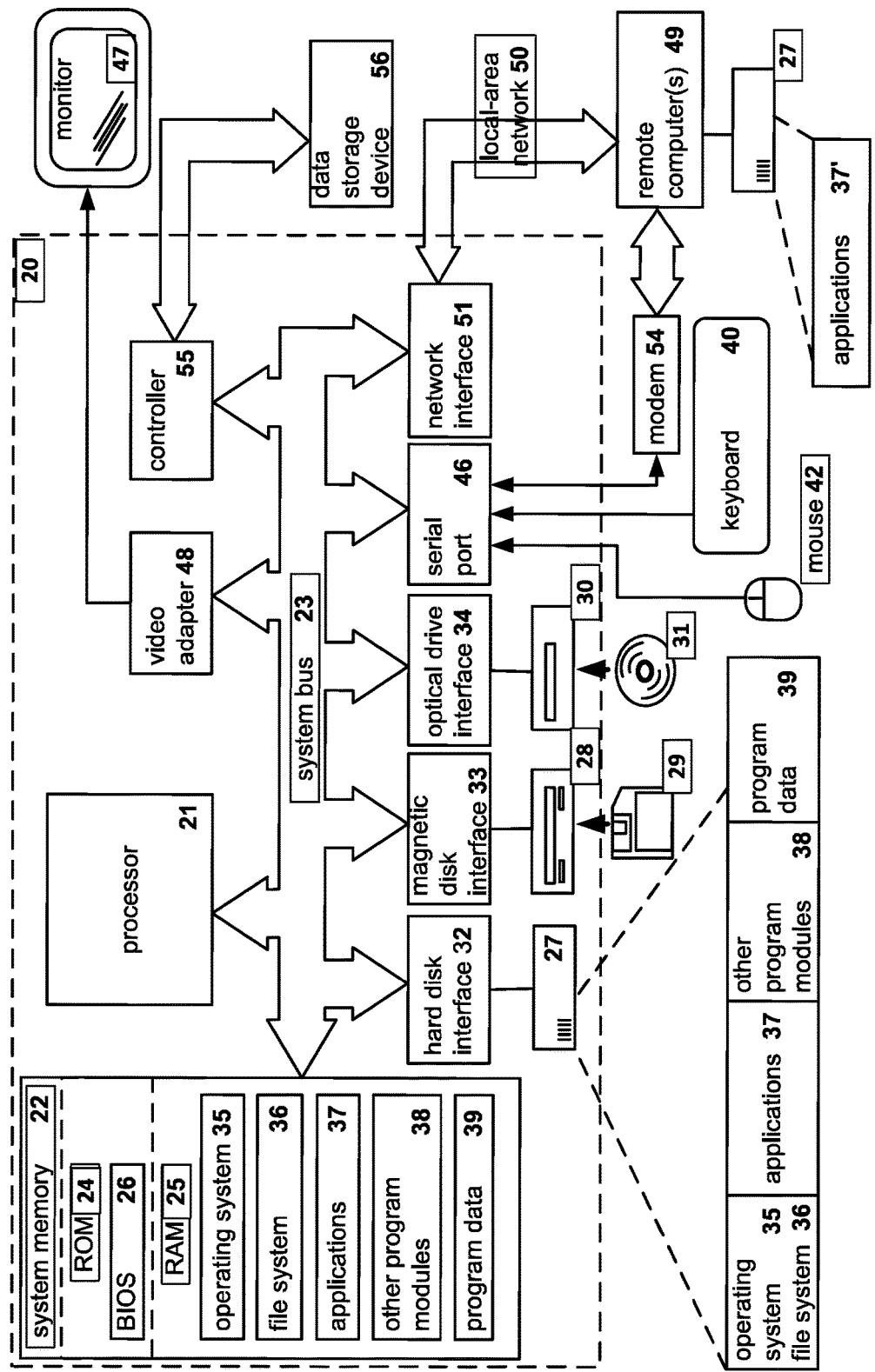
FIG. 3 presents an example of a computer system, a personal computer or a server for implementing aspects of the invention.

FIG. 3 illustrates an example of a computer system or computing device on which the disclosed systems and method may be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a user computer or computing device (such as the module for collecting characteristics 101, the module for constructing the space of relation 102, the identification module 103, and the analysis module 104 described in greater detail in FIGS. 1 and 2 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for detecting a malicious computer system, the method comprising:
    collecting, by a processor, characteristics of a computer system, wherein the characteristics of the computer system are represented as points of a multidimensional space in which each dimension represents one characteristic of the computer system;
    determining relations between collected characteristics of the computer system;
    determining a time dependency of at least one state of the computer system based on determined relations, wherein the time dependency includes rules describing changes in values of the characteristics describing the at least one state of the computer system as a function of time;
    determining the at least one state of the computer system based at least on the time dependency and the changes in values of the characteristics, wherein the at least one state comprises nonstandard behaviors of the computer system, wherein the state of the computer system is represented as a closed surface in the multidimensional space encompassing a region of space whose points characterize a legal state of the computer system; and
    determining a degree of harmfulness of the computer system based on an analysis of the at least one state of the computer system in connection with one or more selected patterns representing a legal or malicious computer system, wherein the analysis comprises calculation of at least one scalar product of a first vector in the multidimensional space and a second vector from the one or more selected patterns, wherein the scalar product represents a degree of difference from the one or more selected patterns representing a legal or malicious computer system.

2. The computer-implemented method of claim 1, wherein collecting the characteristics of the computer system comprises collecting characteristics of at least one of: characteristics of computing resources of the computer system, characteristics of software running on the computer system, and characteristics of data being processed on the computer system.

3. The computer-implemented method of claim 2, wherein the characteristics of computing resources of the computer system comprise at least one of: characteristics of a main memory of the computer system, performance of the computer system, and characteristics of a network environment with which the computer system is associated.

4. The computer-implemented method of claim 2, wherein the characteristics of software running on the computer system comprise at least one of: identifiers of one or more applications running in the computer system and characteristics of files associated with the one or more applications, records from configuration files of the one or more applications running in the computer system, and relations between the one or more applications.

5. The computer-implemented method of claim 2, wherein the characteristics of data being processed on the computer system comprise at least one of: identifiers of a source and a recipient of the data, type of the data, and a data transmission method.

6. The computer-implemented method of claim 1, wherein a relation is configured as a function of a change in values of one characteristic when values of another characteristic are changed, wherein determining the relations between the collected characteristics of the computer system comprises: determining the at least one state of the computer system based at least on a projection in the multidimensional space of selected characteristics.

7. The computer-implemented method of claim 1, wherein the selected patterns representing the legal or malicious computer system are configured to be retrieved from at least one database of patterns, each pattern corresponding to a previously triggered rule for a characteristic change of the computer system.

8. The computer-implemented method of claim 1, further comprising evaluating the degree of harmfulness of the computer system against a selected threshold value to determine whether the computer system is legal or malicious.

9. The computer-implemented method of claim 1, wherein the determining the degree of harmfulness of the computer system is based on a degree of difference of the closed surface representing the state of the computer system from the region of space whose points characterize the legal state of the computer system.

10. A system for detecting a malicious computer system, comprising:
    at least one hardware processor configured to:
        collect characteristics of a computer system, wherein the characteristics of the computer system are represented as points of a multidimensional space in which each dimension represents one characteristic of the computer system;

determine relations between collected characteristics of the computer system;

determine a time dependency of at least one state of the computer system based on determined relations, wherein the time dependency includes rules describing changes in values of the characteristics describing the at least one state of the computer system as a function of time;

determine the at least one state of the computer system based at least on the determined time dependency and the changes in values of the characteristics, wherein the at least one state comprises nonstandard behaviors of the computer system, wherein the state of the computer system is represented as a closed surface in the multidimensional space encompassing a region of space whose points characterize a legal state of the computer system; and determine a degree of harmfulness of the computer system based on an analysis of the at least one state of the computer system in connection with one or more selected patterns representing a legal or malicious computer system, wherein the analysis comprises calculation of at least one scalar product of a first vector in the multidimensional space and a second vector from the one or more selected patterns, wherein the scalar product represents a degree of difference from the one or more selected patterns representing a legal or malicious computer system.

11. The system of claim 10, wherein, to collect the characteristics of the computer system, the at least one processor is further configured to collect characteristics of at least one of: characteristics of computing resources of the computer system, characteristics of software running on the computer system, and characteristics of data being processed on the computer system.

12. The system of claim 11, wherein the characteristics of computing resources of the computer system comprise at least one of: characteristics of a main memory of the computer system, performance of the computer system, and characteristics of a network environment with which the computer system is associated, wherein the characteristics of software running on the computer system comprise at least one of: identifiers of one or more applications running in the computer system and characteristics of files associated with the one or more applications, records from configuration files of the one or more applications running in the computer system, and relations between the one or more applications, and wherein the characteristics of data being processed on the computer system comprise at least one of: identifiers of a source and a recipient of the data, type of the data, and a data transmission method.

13. The system of claim 10, wherein a relation is configured as a function of a change in values of one characteristic when values of another characteristic are changed, wherein the selected patterns representing the legal or malicious computer system are configured to be retrieved from at least one database of patterns, each pattern corresponding to a previously triggered rule for a characteristic change of the computer system, and wherein, to determine the relations between the collected characteristics of the computer system, the at least one processor is further configured to: determine the at least one state of the computer system based at least on a projection in the multidimensional space of selected characteristics.

14. The system of claim 10, wherein the at least one processor is further configured to evaluate the degree of harmfulness of the computer system against a selected threshold value to determine whether the computer system is legal or malicious.

15. A non-transitory computer readable medium storing computer executable instruction for detecting a malicious computer system, including instructions for:

collecting characteristics of a computer system, wherein the characteristics of the computer system are represented as points of a multidimensional space in which each dimension represents one characteristic of the computer system;

determining relations between collected characteristics of the computer system; determining a time dependency of at least one state of the computer system based on determined relations, wherein the time dependency includes rules describing changes in values of the characteristics describing the at least one state of the computer system as a function of time;

determining the at least one state of the computer system based at least on the time dependency and the changes in values of the characteristics, wherein the at least one state comprises nonstandard behaviors of the computer system, wherein the state of the computer system is represented as a closed surface in the multidimensional space encompassing a region of space whose points characterize a legal state of the computer system; and determining a degree of harmfulness of the computer system based on an analysis of the at least one state of the computer system in connection with one or more selected patterns representing a legal or malicious computer system, wherein the analysis comprises calculation of at least one scalar product of a first vector in the multidimensional space and a second vector from the one or more selected patterns, wherein the scalar product represents a degree of difference from the one or more selected patterns representing a legal or malicious computer system.

* * * * *